United States Patent
Pothula et al.

(10) Patent No.: US 8,698,486 B2
(45) Date of Patent: Apr. 15, 2014

(54) METHODS AND SYSTEMS FOR USE IN CHECKING THE POLARITY OF MULTI-COIL SERVOS

(75) Inventors: Suresh Babu Pothula, Hyderabad (IN); Roy Anthony Carter, Salem, VA (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 13/234,353

(22) Filed: Sep. 16, 2011

(65) Prior Publication Data

US 2013/0071226 A1    Mar. 21, 2013

(51) Int. Cl.
*G05D 7/06*    (2006.01)

(52) U.S. Cl.
USPC ............ 324/133; 324/76.11; 251/129.01; 251/129.09

(58) Field of Classification Search
USPC .................. 324/133; 251/129.01, 129.09
See application file for complete search history.

(56) References Cited

U.S. PATENT DOCUMENTS

| | | | |
|---|---|---|---|
| 4,483,260 A * | 11/1984 | Gallant | 112/80.23 |
| 5,214,913 A | 6/1993 | Tani et al. | |
| 6,431,519 B1 * | 8/2002 | Smith | 251/65 |
| 6,508,054 B2 | 1/2003 | Asakura et al. | |
| 6,810,906 B2 * | 11/2004 | Tanaka et al. | 137/487.5 |
| 6,842,637 B2 | 1/2005 | Kandori et al. | |
| 6,883,544 B2 * | 4/2005 | Kawamura et al. | 137/625.65 |
| 7,000,893 B2 | 2/2006 | Yakushi | |
| 7,252,053 B2 * | 8/2007 | Froeschle et al. | 123/90.11 |
| 2006/0012363 A1 * | 1/2006 | Matsumoto | 324/212 |
| 2006/0171091 A1 * | 8/2006 | Seale et al. | 361/160 |
| 2009/0088946 A1 * | 4/2009 | Bauerle et al. | 701/103 |
| 2010/0057393 A1 * | 3/2010 | Einsweiler et al. | 702/108 |
| 2010/0219817 A1 * | 9/2010 | Galka et al. | 324/207.25 |

* cited by examiner

*Primary Examiner* — Arleen M Vazquez
*Assistant Examiner* — Robert P Alejnikov, Jr.
(74) *Attorney, Agent, or Firm* — Armstrong Teasdale LLP

(57) ABSTRACT

A method and system for configuring a valve in a turbine. The method includes transmitting a first signal from a servo to a first coil of an actuator to cause the valve to move to a first position, determining a first magnitude of the valve, and transmitting a second signal from the servo to a second coil of the actuator to cause the valve to move to second position. The method also includes determining a second magnitude of the valve, and comparing the first magnitude to the second magnitude to determine the polarity of wiring coupled between the servo and the actuator.

19 Claims, 3 Drawing Sheets

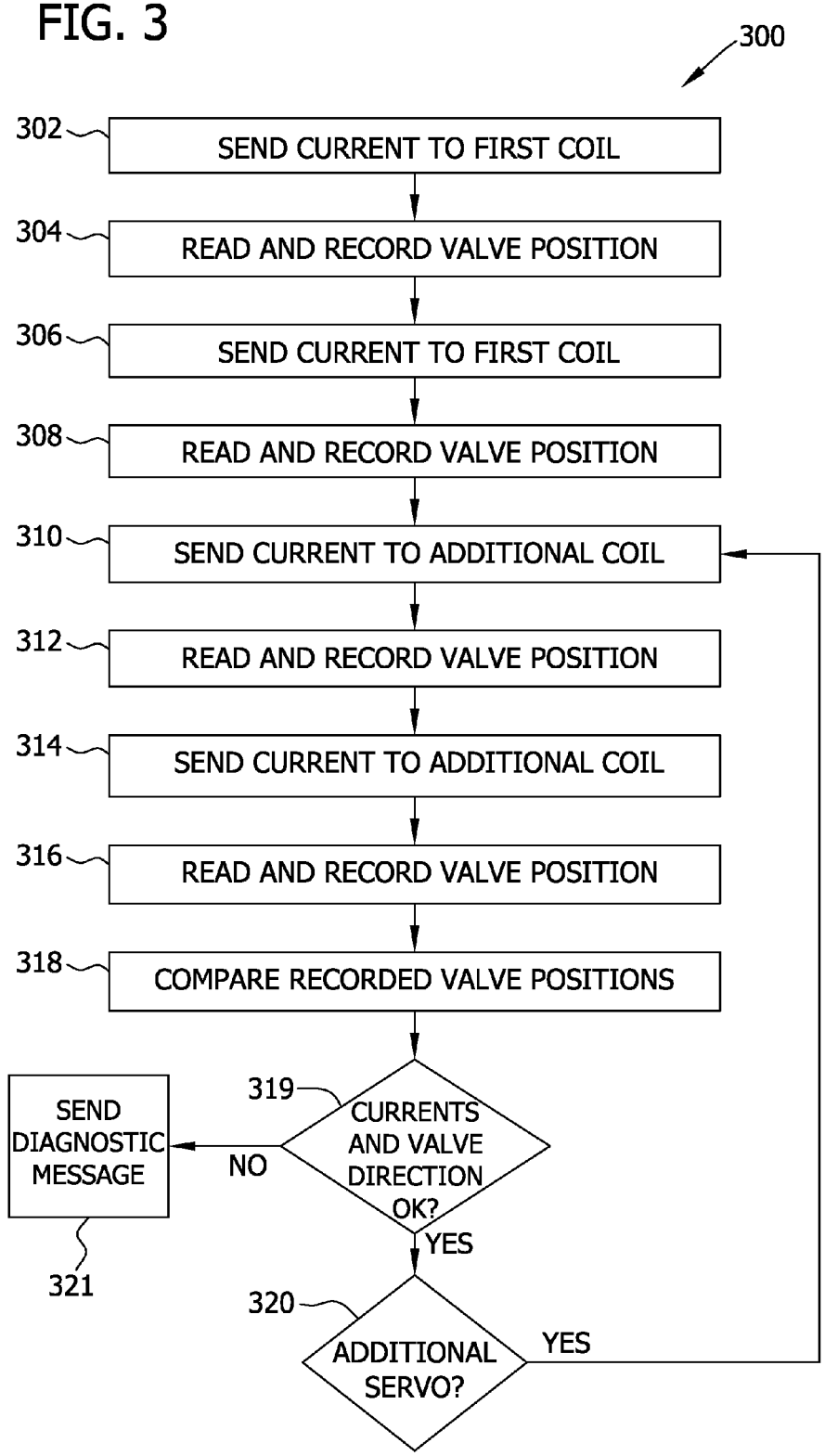

METHODS AND SYSTEMS FOR USE IN CHECKING THE POLARITY OF MULTI-COIL SERVOS

BACKGROUND OF THE INVENTION

The field of the invention disclosed herein relates generally to multi-coil servos, and more particularly to methods and systems for use in checking the polarity of multi-coil servos.

At least some known hydraulic-assisted servos are used to control the position of gas control valves, steam control/bypass valves, and gas turbine inlet guide vanes used with turbines. Many known servo actuators include two or three windings that enable for multiple current inputs. The valve or guide vane move within a turbine in response to the force generated from the current induced by the servos. Servos that do not have the correct polarity may prevent the valve or guide vane from functioning properly and thus have an adverse operating affect on the turbine.

BRIEF DESCRIPTION OF THE INVENTION

In one embodiment, a method for configuring a valve in a turbine is provided. The method includes transmitting a first signal from a servo to a first coil of an actuator to cause the valve to move to a first position, determining a first magnitude of the valve, and transmitting a second signal from the servo to a second coil of the actuator to cause the valve to move to second position. The method also includes determining a second magnitude of the valve, and comparing the first magnitude to the second magnitude to determine the polarity of wiring coupled between the servo and the actuator.

In an alternative embodiment, a system for configuring a valve in a turbine is provided. The system includes a hydraulic valve assembly comprising a valve, an actuator coupled to the hydraulic valve assembly configured to move the valve, the actuator comprising a first coil and a second coil, a servo coupled to the actuator configured to transmit a signal instructing the actuator to move the valve, and at least one position sensor configured to determine a magnitude of the valve.

In another embodiment, a computer program product comprising computer-readable memory and program code having computer-executable components is provided. The components include a monitoring component that when executed by at least one processor unit causes the at least one processor unit to transmit a first signal from a servo to a first coil of an actuator to cause a valve to move to a first position, determine a first magnitude of the valve, transmit a second signal from the servo to a second coil of the actuator to cause the valve to move to a second position, and determine a second magnitude of the valve. The components also include a comparison component that when executed by at least one processor unit causes the at least one processor unit to compare the first magnitude to the second magnitude to determine the polarity of wiring coupled between the servo and the actuator.

BRIEF DESCRIPTION OF THE DRAWINGS

FIG. 3 is a flowchart of an exemplary method that may be used to check the polarity check of a multi-coil servo, such as the multi-coil servo shown in FIGS. 1 and 2.

DETAILED DESCRIPTION OF THE INVENTION

Figure 1:
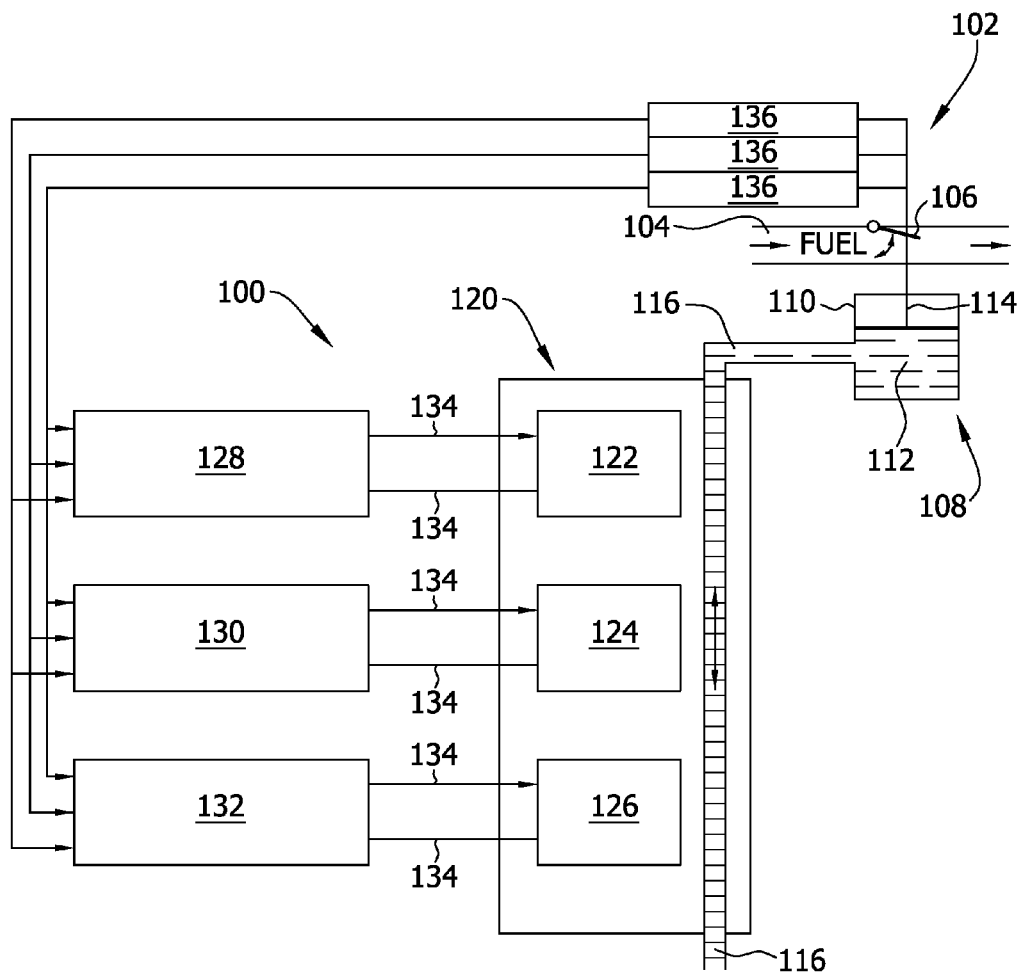
FIG. 1 is a schematic illustration of an exemplary multi-coil servo and hydraulic valve.

FIG. 1 is a schematic illustration of an exemplary multi-coil servo 100 and hydraulic valve assembly 102. In the exemplary embodiment, hydraulic valve assembly 102 includes a fuel supply line 104, a valve or vane 106 coupled to fuel supply line 104, and a cylinder 108 that includes a canister 110 that retains hydraulic fluid 112 therein that is used to selectively open and close valve 106. More specifically, cylinder 108 opens valve 106 by enabling canister 110 to be filled with hydraulic fluid 112 via a hydraulic fluid line 116. As canister 110 is filled, a plunger 114 is moved causing valve 106 to open. To close valve 106, hydraulic fluid 112 is emptied from canister 110 via hydraulic fluid line 116. As fluid 112 is discharged from canister 110, plunger 114 drops into canister 110 and valve 106 is closed. In the exemplary embodiment, hydraulic valve assembly 102 is a gas control assembly that may be used in a gas turbine. Alternatively, hydraulic valve assembly 102 may be used in any fuel supply apparatus to regulate any fuel feed, including, but not limited to, steam for use with a steam turbine.

In the exemplary embodiment, an actuator 120 is coupled to hydraulic fluid line 116 for use in selectively draining and filling canister 110 with fluid 112 from line 116. In the exemplary embodiment, actuator 120 includes a first coil 122, a second coil 124, and a third coil 126 that, in combination, form a three coil servo control. Alternatively, actuator 120 may have a number of coils that enables valve assembly 102 to function as described herein. In the exemplary embodiment, each coil 122, 124, and 126 is controlled by a servo. In the exemplary embodiment, first coil 122 is controlled by a first servo 128, second coil 124 is controlled by a second servo 130, and third coil 126 is controlled by a third servo 132. More specifically, in the exemplary embodiment, a single servo 128, 130, and 132, respectively controls each coil 122, 124, and 126. Alternatively, any number of servos can be used to control any number of coils.

Each coil 122, 124, and 126 is electrically coupled to its respective servo 128, 130, and 132 by a pair of current carrying wires 134 in the exemplary embodiment. Wires 134 enable each servo 128, 130, and 132 to transmit a control signal to its respective coil 122, 124, and 126. The transmission of control signals creates a magneto-motive force (MMF) that induces movement of actuator 120.

In the exemplary embodiment, servos 128, 130, and 132 are voltage-controlled current sources. The control signal outputted from servos 128, 130, and 132 is a current. The current passing through coils 122, 124, and 126 induces a MMF or a magnetic field. This MMF provides the force to move the servo actuator spool backward and forward based on the direction of the current and the magnitude of the spool displacement directly proportional to the magnitude of the current. The spool allows the supply side of the pressurized hydraulic fluid to fill the cylinder or drain the fluid back to the low pressure side of the hydraulic system.

As such, when wires 134 incorrectly electrically couple servos 128, 130, and 132 to coils 122, 124, and 126, a reverse polarity is provided that reverses the control signal transmitted to each coil 122, 124, and 126. As such, if one set of wires 134 from servos 128, 130, and 132 are wired in reverse to respective coils 122, 124, and 126, the total MMF will be reduced because the reversed coil MMF is working against the other two coils MMF affecting the spoil response time to a current command request from the servos.

In the exemplary embodiment, each servo 128, 130, and 132 is coupled to a position sensor 136. Each position sensor 136 is coupled to valve 106 to enable a position of valve 106 within hydraulic valve assembly 102 to be determined. More specifically, each position sensor 136 detects the position of valve 106 with respect to fuel supply line 104 (e.g., 40% open/60% closed). In the exemplary embodiment, three position sensors 136 are used to provide redundancy. Alternatively, any number of position sensors 136 may be used in conjunction with any number of servos 128, 130, and 132.

Figure 2:
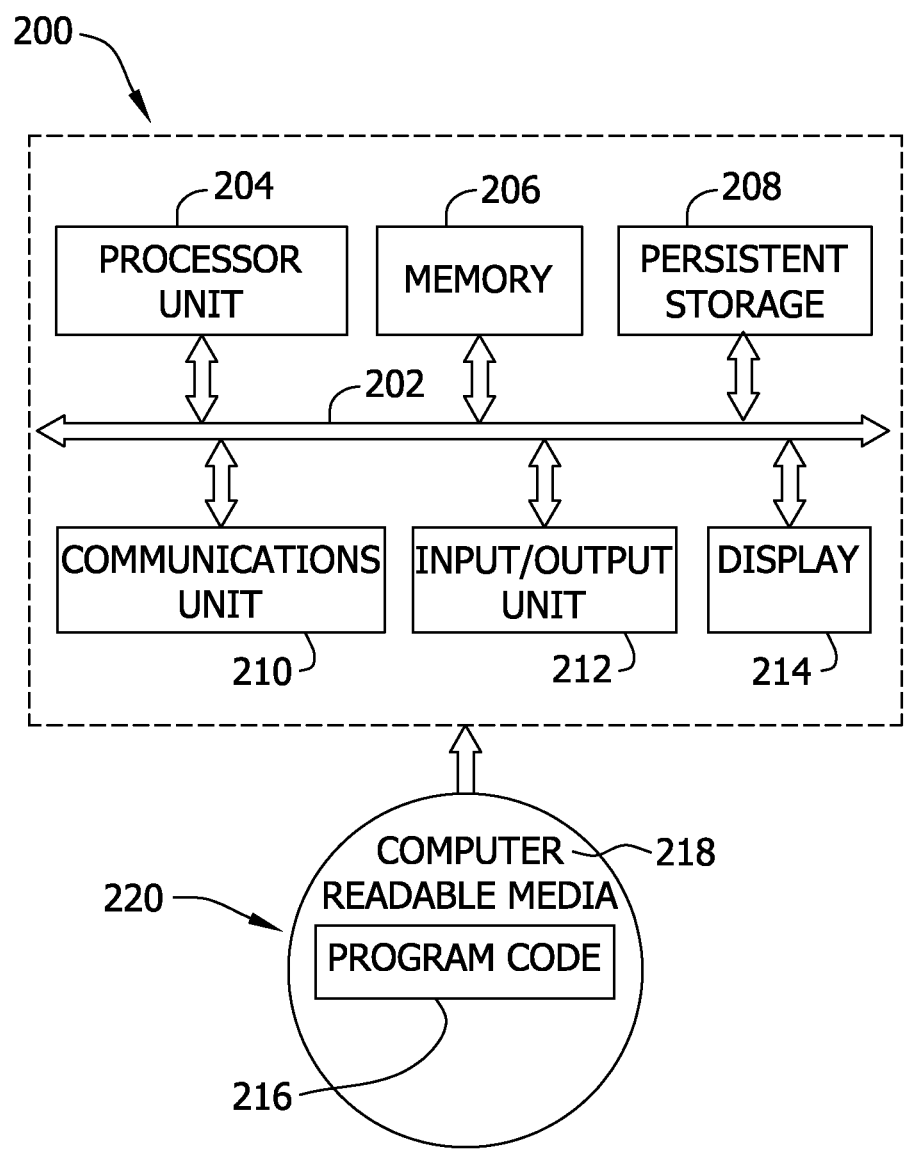
FIG. 2 is a block diagram of the multi-coil servo shown in FIG. 1.

FIG. 2 is a block diagram of an exemplary servo 200, that may be used with servo 100 (shown in FIG. 1) in place of servos 128, 130, and 132 (all shown in FIG. 1). In the exemplary embodiment, servo 200 includes a communications fabric 202 that enables communications between a processor unit 204, a memory 206, persistent storage 208, a communications unit 210, an input/output (I/O) unit 212, and a presentation interface, such as a display 214. In addition to, or in the alternative, the presentation interface may include an audio device (not shown) and/or any device that is capable of conveying an output to a user.

In the exemplary embodiment, processor unit 204 executes instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. In another embodiment, processor unit 204 may be a symmetric multi-processor system containing multiple processors of the same type.

Memory 206 and persistent storage 208 are exemplary storage devices. As used herein, a storage device is any piece of hardware that is capable of storing information either on a temporary basis and/or a permanent basis. Memory 206, in these examples, may be, without limitation, a random access memory or any other suitable volatile or non-volatile storage device. Persistent storage 208 may take various forms depending on the particular implementation. For example, without limitation, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, without limitation, a removable hard drive may be used for persistent storage 208.

Communications unit 210, in these examples, enables communications with other computer systems or devices. In these examples, communications unit 210 is a network interface card. Communications unit 210 may communicate through the use of either, or both, physical and wireless communication links.

Input/output unit 212 enables input and output of data with other devices that may be connected to servo 200. For example, without limitation, input/output unit 212 may provide a connection for user input through a user input device, such as a keyboard and/or a mouse. Further, input/output unit 212 may transmit output to a printer. Display 214 provides a mechanism to display information to a user. For example, a presentation interface such as display 214 may display a graphical user interface, such as those described herein.

In the exemplary embodiment, instructions for the operating system and applications or programs are stored on persistent storage 208. These instructions may be loaded into memory 206 for execution by processor unit 204. The processes of the different embodiments may be performed by processor unit 204 using computer implemented instructions and/or computer-executable instructions, which may be located in a memory, such as memory 206. Such instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located on computer readable media 218 that is selectively removable and that enables such instructions to be loaded onto or transferred to servo 200 for execution by processor unit 204. In these examples, program code 216 and computer readable media 218 form computer program product 220. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to servo 200. The tangible form of computer readable media 218 is also referred to as computer recordable storage media. In some instances, computer readable media 218 may not be removable.

Alternatively, program code 216 may be transferred to servo 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or computer system for use within servo 200. For instance, program code stored in a computer readable storage medium in a server computer system may be downloaded over a network from the server to servo 200. The computer system providing program code 216 may be a server computer, a client computer, or some other device capable of storing and transmitting program code 216.

Program code 216 may be organized into computer-executable components that are functionally related. For example, program code 216 may include a transaction receiving component, a validation component, a display component, and/or any component suitable for the methods described herein. Each component may include computer-executable instructions that, when executed by processor unit 204, cause processor unit 204 to perform one or more of the operations described herein.

The different components illustrated for servo 200 are not meant to provide architectural limitations to the manner in which different embodiments may be implemented. The different illustrative embodiments may be implemented in a computer system including components in addition to or in place of those illustrated for servo 200. Other components shown in FIG. 2 can be varied from the examples. For example, a storage device in servo 200 may be any hardware apparatus that stores data. Memory 206, persistent storage 208 and computer readable media 218 are examples of storage devices in a tangible form.

In another example, communications fabric may be implemented as a bus system and may include one or more buses (not shown), such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 206 or a cache such as that found in an interface and memory controller hub that may be present in communications fabric 202.

FIG. 3 is a flowchart of an exemplary method 300 that may be used to check the polarity of a hydraulic valve, such as valve assembly 102, shown in FIG. 1. Method 300 can be automated such that a computing device, such as servo 200, performs method 300. In the exemplary embodiment, first servo 128 sends or transmits 302 a current to first coil 122 that instructs first coil 122 to generate a maximum MMF to move valve 106 in one direction. In the exemplary embodiment, first servo 128 sends 302 a current to first coil 122 to move valve 106 into a fully open position. When valve 106 is operated at a relatively steady state, position sensor 136 records 304 a position, i.e., a magnitude, of valve 106 relative to fuel supply line 104. In the exemplary embodiment, when valve 106 is operated at a relatively steady state, first servo 128 transmits a current to first coil 122 instructing first coil 122 to generate zero MMF and position sensor 136 records 304 a position of valve 106.

First servo 128 then sends or transmits 306 an opposite current of the current transmitted 302 to first coil 122 that instructs first coil 122 to generate a maximum MMF to move valve 106 in a direction opposite of step 302. When valve 106 is operated at a relatively steady state, first coil 122 instructs first coil 122 to generate zero MMF and position sensor 136 records 308 a position of valve 106 relative to fuel supply line 104. In the exemplary embodiment, to accurately determine the position of sensor 136 relative to valve 106, readings from three position sensors 136 are averaged and the resulting average is recorded 308. Alternatively, any number of position sensors in any combination may be used determine the position of valve 106.

In the exemplary embodiment, a second servo 130 then sends or transmits 310 a current that is the same as the current transmitted in step 302 to a second coil 124 instructing second coil 124 to generate a maximum MMF to move valve 106 in one direction. When valve 106 is operated at a relatively steady state, second servo 130 transmits a current to second coil 124 instructing second coil 124 to generate zero MMF and position sensor 136 records 312 a position, i.e., a magnitude, of valve 106 relative to fuel supply line 104. Second servo 130 then transmits 314 an opposite current than transmitted 310 current to first coil 122 to generate a maximum MMF to move valve 106 in a direction opposite of step 310. When valve 106 is operated at a relatively steady state, second coil 124 instructs second coil 124 to generate zero MMF and position sensor 136 records 316 a position of valve 106 relative to fuel supply line 104.

After position readings of valve 106 resulting from the MMF generated by second coil are recorded 312 and 316, the position readings recorded 304 and 312 during the maximum MMF generated by coils 122 and 124 are compared 318 to determine the polarity of the wiring 134 between servos 128 and 130 and respective coils 122 and 124. The position readings recorded 308 and 316 from the maximum MMF generated by coils 122 and 124 is also compared 318 to determine the polarity of wiring 134.

In the exemplary embodiment, if the comparison 318 reveals that the recorded 304 position of valve 106 is within 2% of the recorded position of valve 106, wiring 134 is determined to have the correct polarity achieved. In one embodiment, a check is made that current phasing agrees with each other and with the direction the valve should move. Alternatively, if the comparison 318 of the recorded position of valve 106 is opposite of the recorded position of valve 106, the polarity of wiring 134 is determined to be incorrect. Alternatively, the recorded 304 position of valve 106 and the recorded 312 position of valve 106 may be compared in any manner that enables a comparison to be made, as described, herein such as a comparison of Voltage.

After the comparison is made 318, a determination is then made as to whether the currents and the direction movement of valve 106 is correct 319. If it is not correct, a diagnostic message to rewire any erroneously wired coils 134 is made available 321. If the currents and the direction movement of valve 106 is correct 319, a determination is made whether it is necessary to check the polarity of any other servo and coil. If an additional servo is to be checked 320, the method 300 described herein is repeated to enable an additional servo to be compared against first servo 128.

The exemplary methods and systems described herein enable a simplified polarity check for a multi-coil servo. More specifically, the methods and systems described herein eliminate the manual intervention in a polarity check. Moreover, the methods and systems described herein will check to see that all the servo coils are connected with the same polarity, which will in turn enable the valve assembly to operate more effectively and thereby ensuring increasing unit availability by avoiding trips due to reverse polarity.

A technical effect of the methods, systems, and computer products described herein includes at least one of: (a) transmitting a first signal from a servo to a first coil of an actuator to cause the valve to move to a first position; (b) determining a first magnitude of the valve; (c) transmitting a second signal from the servo to a second coil of the actuator to cause the valve to move to second position; (e) determining a second magnitude of the valve; and (f) comparing the first magnitude to the second magnitude to determine the polarity of wiring coupled between the servo and the actuator. Exemplary embodiments of methods and systems are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for performing diagnostics on a valve in a turbine, said method comprising:

transmitting a first signal from a servo to a first coil of an actuator to cause the valve to move to a first position;

determining the first position of the valve, wherein the first position has a first magnitude;

transmitting a second signal from the servo to a second coil of the actuator to cause the valve to move to second position;

determining the second position of the valve, wherein the second position has a second magnitude; and comparing the first magnitude to the second magnitude to determine the polarity of wiring coupled between the servo and the actuator.

2. A method in accordance with claim 1, further comprising:
transmitting a third signal from the servo to a third coil of the actuator to cause the valve to move to a third position;
determining a third position of the valve, wherein the third position has a third magnitude; and
comparing the first magnitude with the third magnitude to verify the polarity of wiring coupled between the servo and the actuator.

3. A method in accordance with claim 2, wherein transmitting a third signal from a servo to a third coil of the actuator further comprises transmitting a third signal to the actuator that causes the third coil to generate a maximum magneto-motive force.

4. A method in accordance with claim 3, wherein transmitting a third signal from a servo to a third coil of the actuator further comprises transmitting a zero signal from a servo to the third coil of the actuator that causes the third coil to generate a zero magneto-motive force.

5. A method in accordance with claim 1, wherein determining the first position further comprises determining the first magnitude using at least one position sensor.

6. A method in accordance with claim 1, wherein comparing the first magnitude with the second magnitude further comprises determining if the first magnitude is within a predetermined percentage of the second magnitude.

7. A method in accordance with claim 1, wherein transmitting a first signal from a servo to a first coil of the actuator to move the valve further comprises transmitting a first signal to a first coil of the actuator that causes the first coil to generate a maximum magneto-motive force.

8. A method in accordance with claim 1, wherein transmitting a second signal from a servo to a second coil of the actuator to move the valve further comprises transmitting a second signal to a second coil of the actuator that causes the second coil to generate a maximum magneto-motive force.

9. A method in accordance with claim 7, wherein transmitting a first signal from a servo to a first coil of the actuator further comprises transmitting a zero signal from the servo to the first coil of the actuator that causes the first coil to generate a zero magneto-motive force.

10. A method in accordance with claim 8, wherein transmitting a second signal from a servo to a second coil of the actuator further comprises transmitting a zero signal from the servo to the second coil of the actuator that causes the second coil to generate a zero magneto-motive force.

11. A multi-coil servo system for use with a hydraulic valve assembly comprising a valve, said system comprising:
an actuator coupled to said hydraulic valve assembly for use in selectively moving said valve, said actuator comprising a first coil and a second coil;
at least one position sensor configured to determine positional magnitudes of said valve; and
a servo coupled to said actuator and configured to transmit a signal that causes said actuator to selectively move said valve, said servo configured to:
transmit a first signal from said servo to said first coil to cause said valve to move to a first position;
determine the first position of said valve, wherein the first position has a first magnitude;
transmit a second signal from said servo to said second coil to cause said valve to move to second position;
determine the second position of said valve, wherein the second position has a second magnitude; and
compare the first magnitude to the second magnitude to determine the polarity of wiring coupled between said servo and said actuator.

12. A system in accordance with claim 11, wherein said servo comprises a first servo configured to transmit the first signal to said first coil.

13. A system in accordance with claim 12, wherein said servo comprises a second servo configured to transmit the second signal to said second coil.

14. A system in accordance with claim 13, wherein said actuator comprises a third coil and wherein said servo comprises a third servo configured to transmit a signal to said third coil.

15. A system in accordance with claim 11, wherein said servo is configured to record one of the first magnitude and the second magnitude determined from said at least one position sensor.

16. A system in accordance with claim 11, wherein said servo is configured to determine if the first magnitude is within a predetermined percentage of the second magnitude.

17. A system in accordance with claim 11, wherein said servo is configured to compare recorded magnitudes of said valve determined from said at least one position sensor.

18. A computer program product comprising computer-readable memory and program code having computer-executable components, said components comprising:
a monitoring component that when executed by at least one processor unit causes the at least one processor unit to:
transmit a first signal from a servo to a first coil of an actuator to cause a valve to move to a first position;
determine the first position of the valve, wherein the first position has a first magnitude;
transmit a second signal from the servo to a second coil of the actuator to cause the valve to move to a second position; and
determine the second position of the valve, wherein the second position has a second magnitude; and
a comparison component that when executed by at least one processor unit causes the at least one processor unit to compare the first magnitude to the second magnitude to determine the polarity of wiring coupled between the servo and the actuator.

19. A computer program product in accordance with claim 18, wherein said monitoring component, when executed by at least one processor unit causes the at least one processor unit to further:
transmit a third signal from the servo to a third coil of the actuator to cause the valve to move to a third position; and
determine the third position of the valve, wherein the third position has a third magnitude; and
wherein the comparison component that when executed by at least one processor unit causes the at least one processor unit to further compare the first magnitude to the third magnitude to determine the polarity of wiring coupled between the servo and the actuator.

* * * * *